(No Model.)
C. F. COMPTON.
POTATO CHOPPER.
No. 493,684. Patented Mar. 21, 1893.
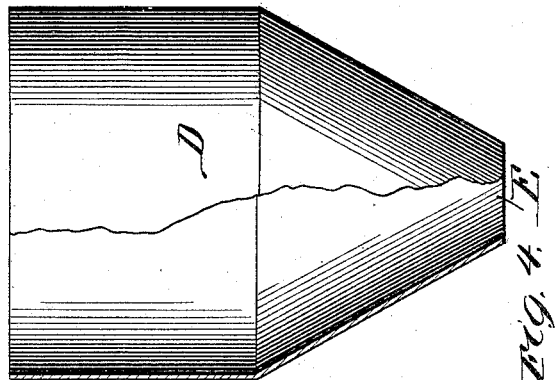
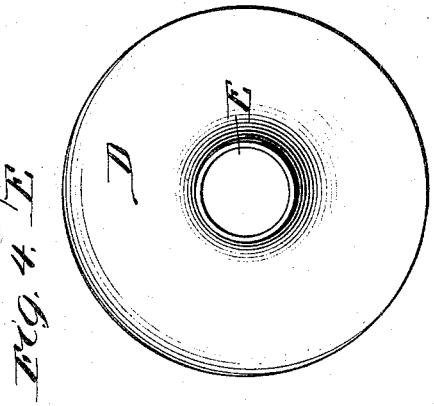
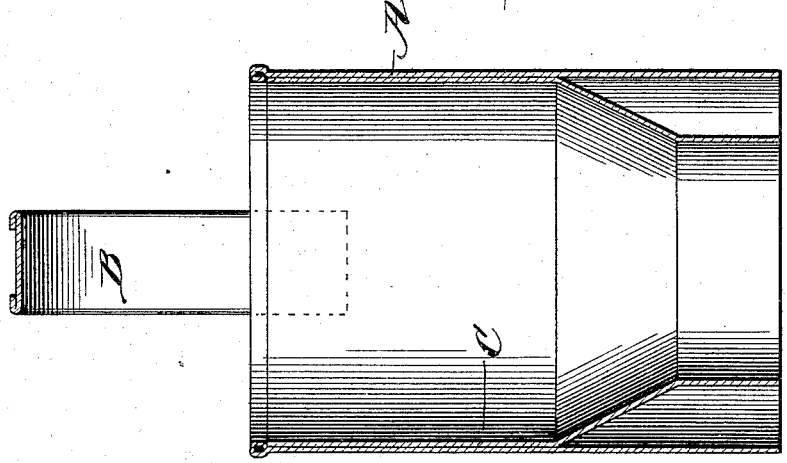
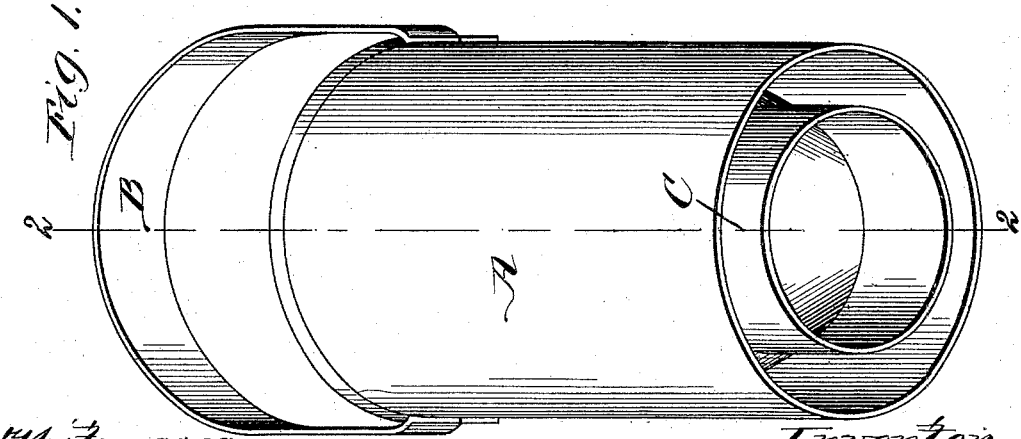
Witnesses
W. C. Corlies
R. C. Pages
Inventor
Curtis F. Compton.
By Coburn & Thacher
Attys
THE NORRIS PETERS CO., PHOTO-LITHO., WASHINGTON, D. C.

UNITED STATES PATENT OFFICE.

CURTIS F. COMPTON, OF DAVISON, MICHIGAN.

POTATO-CHOPPER.

SPECIFICATION forming part of Letters Patent No. 493,684, dated March 21, 1893.

Application filed September 13, 1892. Serial No. 445,733. (No model.)

*To all whom it may concern:*

Be it known that I, CURTIS F. COMPTON, a citizen of the United States, residing at Davison, in the county of Genesee and State of Michigan, have invented a certain new and useful Improvement in Potato-Choppers, which is fully set forth in the following specification, reference being had to the accompanying drawings, in which—

Figure 1 represents a perspective view of my invention; Fig. 2, a vertical central view, taken at the line 2—2, Fig. 1; Fig. 3, a side elevation of one of the interior removable cylinders, with a portion cut away, and Fig. 4 is a bottom view of the same.

The object of my invention is to make a cheap and efficient implement to be used in families for cutting boiled potatoes. It is customary to prepare and cut up boiled potatoes that may be left over and become cold, and reheat them for the table, and they are now usually cut into pieces with a knife, which necessitates taking each potato in one hand and cutting it into pieces with a knife held in the other hand.

With my invention, the potatoes are cut into suitable pieces for rewarming while they are in a dish or bowl of any kind.

My potato chopper may also be used for cutting pastry or cakes into any desired shape.

My invention consists in the special construction and combination of the various parts hereinafter fully described and made the subject matter of the claim.

In the accompanying drawings, A represents a metal cylinder, open at both ends, and strengthened at the top by turning over the edge either with or without a wire.

B, is the handle, which is secured to the cylinder A by soldering, or otherwise.

C, is a cylinder, also open at both ends, one end of which is made considerably smaller than the cylinder A, as clearly shown in Fig. 2. The body of the cylinder C is made of the size to slip snugly within the cylinder A, and when placed therein the upper end of it rests against the turned over upper edge of the cylinder A.

D, is another cylinder, the body of which also fits snugly within the cylinder A, the same as the cylinder C. The lower end of the cylinder D is smaller than the lower end of the cylinder C, and when it is inserted inside of the cylinder C, the implement may be used for cutting cakes. The small end or mouth E of the cylinder D may be used for cutting a hole in the center of the cake, while the cylinder A cuts the cake itself.

I may make different cylinders with different shaped mouth-pieces to be used inside of the cylinder A, but they are all made substantially the same as the cylinders C and D so far as being adapted to slide into the cylinder A is concerned, and be held by it when used. I find that the cylinder D, when inserted in the cylinder A, can also be used as a funnel for pouring liquids into bottles, or other vessels.

The interior cylinders can be readily removed and a different one inserted, according to the size and shape of pieces which it is desired to cut with the cutter. These cylinders can be made very cheaply and readily, and the interior cylinders can be readily removed and another one inserted very readily, adapting the implement to any desired use. These cylinders are cut in blanks, and made by soldering, or otherwise, in any of the well-known ways of making metal dishes. I preferably make them of tin.

Having fully described the construction and operation of my invention, what I claim as new, and desire to secure by Letters Patent, is—

A potato-chopper consisting of a cylinder A provided with a suitable handle and a removable interior cylinder, the body of which fits closely within the body of the cylinder A by which it is held in position, one end of said interior cylinder being smaller than the other, substantially as specified.

CURTIS F. COMPTON.

Witnesses:
 FRED BAND,
 PEARL COWIN.